Patented Mar. 13, 1945

2,371,527

UNITED STATES PATENT OFFICE 2,371,527

METHOD OF RAISING THE pH OF SACCHARIN LIQUIDS

William A. La Lande, Jr., Upper Darby, Pa., assignor to Porocel Corporation, Philadelphia, Pa., a corporation of Delaware No Drawing. Application May 1, 1941.
Serial No. 391,371

15 Claims. (Cl. 127—55)

The present invention relates to the treatment of saccharin liquids, and more particularly to a method for adjusting the pH of sugar solutions.

An object of this invention is the provision of a method for raising the pH of sugar solutions having an undesirably low pH.

The subject of pH control has always been recognized as one of extreme importance in the sugar industry, and particularly is this true in cane-sugar refining, because of the danger involved in operating with either excessive acidity or excessive alkalinity. As is generally known, if cane-sugar products are limed to excessive alkalinity, invert sugar is decomposed, with the formation of objectionable coloring matter and of organic acids, with the result that not only may the original acidity of the material be restored, but melassigenic lime salts are left in process, thus diminishing the yield of crystallizable sugar. On the other hand, if these products are insufficiently limed, the normal acidity of the material will cause considerable inversion of the sucrose with resulting loss of yield. In order to minimize inversion without effecting excessive decomposition of invert sugar, it is generally considered good practice to maintain sugar solutions as close as possible to pH 7.0.

It is conventional practice to decolorize and refine saccharin liquids, and particularly crude sugar solutions, by filtration through the decolorizing carbon such as animal char. It has also been proposed to substitute for animal char, various other decolorizing or refining agents such as fuller's earth, aluminum trihydrate, and dehydrated or partially dehydrated bauxite. Of these decolorizing agents, animal char and bauxite have been found capable of producing commercially practical yields of refined sugar solution, i. e., of the order of 2 to 3 pounds of refined sugar solids per pound of char or bauxite. Fuller's earth, on the other hand, has been found commercially impractical as a decolorizing or refining agent, due to its poor decolorizing efficiency and the resultant low yields of decolorized sugar solution obtained therewith. For example, filtration of a washed sugar liquor through bone char to a yield of 2 pounds of sugar solids per pound of char reduced the color from 31.3 to 2.0. In effecting the same color reduction with fuller's earth, a yield of only 0.01 pound of sugar solids per pound of earth was obtained.

During the refining of saccharin liquids, and particularly sugar solutions, an undesirably low pH is sometimes produced by the action of the refining agents or by unfavorable operating conditions. For example, sugar solutions of pH 7.0 to 7.5, when filtered through bone char, may yield filtrates with a pH as low as 6.0, and sugar solutions of pH 6.7 to 7.2 when filtered through calcined bauxite, may yield filtrates with a pH as low as 5.8. Furthermore, sugar solutions, in various stages of refinement, are continually under the influence of heat and therefore subject to the development of acidity through the decomposition of glucose present in the invert sugar, and this acidity is usually reflected by a decrease in pH. In order to restore the pH to the desired value, resort is had to the addition of lime, caustic soda, or other bases, with the result that the ash content of the sugar solution is increased and partial color reversion occurs.

I have found that such decrease in pH of saccharin liquids, and particularly sugar solutions, may be remedied in a relatively simple manner, without substantially increasing the ash content of the solutions or darkening the color thereof. In accordance with my invention, sugar solutions having an undesirably low pH are treated with fuller's earth, particularly fuller's earth of the Georgia-Florida type, whereby the pH of the solutions may be raised to 7.0 or higher. One of the most effective pH adjusting agents is fuller's earth which has been heated or calcined at temperatures of from 700° F. to 1600° F. and cooled prior to use. My method of adjusting the pH of sugar solutions is not to be confused with the prior art processes for decolorizing sugar solutions with fuller's earth, since in accordance with my process such large quantities of sugar solution are treated per unit weight of fuller's earth that the decolorizing effect is negligible.

In carrying out my treatment for adjusting or increasing the pH of sugar solutions, the solution may be either filtered through a bed of the granular fuller's earth, or intimately contacted with such earth in finely divided form, and thereafter separated by decantation, centrifuging, or filter pressing. However, I prefer to employ fuller's earth of the Georgia-Florida type, in the form of granules of 10–30 mesh or 30–60 mesh, although other size ranges may be utilized. The quantity of sugar solution and the increase in pH thereof will vary with the nature of the solution and the temperature at which the fuller's earth has been calcined. In general, the yield of sugar solution of substantially increased pH will be in excess of about 10 pounds of sugar solids per pound of earth, and as the calcination temperature of the fuller's earth is increased, the higher will be the pH of the solution treated. The temperature at which the pH adjusting treatment is carried out may be from 60° F. to 200° F., and is preferably of the order of 160° F.–170° F. Fuller's earth which has become spent and therefore ineffectual in increasing the pH of sugar solutions, may be regenerated or revivified by washing with water, steaming, and calcining at temperatures within the range of 700° F. to 1600° F., and thereafter reused. Fuller's earth which has been successively used and regenerated at a temperature of 900° F. until completely exhausted may then be regenerated at a higher temperature, for example, 1100° F., and repeatedly used and regenerated at such temperature until again completely exhausted, at which time it may be regenerated at a still higher temperature, for example, 1300° F., and repeatedly used and regenerated at this temperature. This procedure may be employed until the fuller's earth is exhausted after regeneration at the highest practical temperature.

My method of increasing the pH of sugar solutions is particularly applicable to solutions which have been substantially decolorized by filtration through adsorbents such as bone char and activated bauxite which may cause a decrease in pH during filtration. For example, a sugar solution which has been decolorized by filtration through bone char or bauxite and which has an undesirably low pH of the order of 6.0–6.5, may be percolated through a bed of fuller's earth activated by heating at temperatures of 700° F. to 1600° F. and cooled prior to use. The first filtrate coming from the fuller's earth bed may have a pH of 7.5, and the filter may be run until the pH of the filter stream reaches 7.0, or until the pH of the composite filtrate is 7.0. The increase in pH of the sugar solutions is independent of the rate of flow through the filter and exceedingly high rates of flow may be employed. For example, substantially the same increase in pH of sugar solutions was obtained with rates of flow ranging from 30 to 1500 gallons per ton per hour. The yield of filtered solution of pH 7.0 is usually in excess of 10 pounds of sugar solids per pound of earth, and may be of the order of several hundred pounds of sugar solids per pound of earth. When running to high yields of sugar solution of increased pH, in accordance with this invention, the refining effect of fuller's earth is negligible. Depending upon the purity of the sugar solution charged, the yield of solution of desired pH may vary considerably. For example, washed sugar liquors of relatively high purity, when filtered through fuller's earth for the adjustment of pH, yield from 50 to 230 pounds of sugar solids per pound of earth, while wash syrups of lower purity yield from 12 to 100 pounds of sugar solids per pound of earth.

I have found that in carrying out my treatment for adjusting pH in conjunction with a decolorizing treatment with an adsorbent, such as bone char or activated bauxite, it is necessary that the sugar solution first be filtered through the decolorizing agent and then through the pH adjusting agent, i. e., fuller's earth, otherwise no pH adjustment is obtained. For example, a washed sugar liquor of pH 6.3, when filtered through granular fuller's earth activated by calcining at 900° F., yielded a filtrate of pH 7.1. This filtrate, when decolorized by percolation through granular bauxite activated by heating at 1200° F., yielded a filtrate of pH 5.5. On the other hand, the washed sugar liquor of pH 6.3, when filtered first through the bauxite for decolorization, gave a filtrate of pH 6.1, and the latter, when percolated through the fuller's earth, gave a filtrate of pH 7.0. In order to obtain the desired increase in pH in conjunction with decolorization, it is evident that the decolorization treatment must precede the treatment with a pH adjusting agent such as fuller's earth, otherwise the effect of the pH adjustment is lost.

I have further discovered that the temperature at which fuller's earth has been heated or calcined will have a profound effect upon the pH adjusting ability of such earth for sugar solutions. This will be noted from the results tabulated below, in which two different sugar solutions having pH 6.1 and 6.2, respectively, were filtered through new fuller's earth which had been activated by calcining at various temperatures. In all cases the calcination period was ½ hour at the temperatures noted. The filters were run to yields of 4 pounds of sugar solids per pound of earth, and similar differences were noted when the filters were run to substantially higher yields.

|  | Calcination temperature | | | | |
| --- | --- | --- | --- | --- | --- |
|  | 700° F. | 900° F. | 1,100° F. | 1,300° F. | 1,500° F. |
| Solution #1, pH filtrate | 6.4 | 7.1 | 7.8 | 8.0 | 8.0 |
| Solution #2, pH filtrate | | 7.3 | 7.9 | 8.6 | |

In general, fuller's earths which have been calcined at temperatures of 700° F. or higher will exhibit a pH adjusting effect, the maximum being attained with earths calcined at 1100° F. or higher. I prefer, however, to employ as pH adjusting agents, fuller's earth which has been calcined at a temperature of from 900° F. to 1300° F. Fuller's earth which has become spent and has been regenerated by washing and recalcination, or regenerated fuller's earth from the petroleum refining industry, has been found entirely satisfactory for adjusting the pH of sugar solutions. Fuller's earth which has been alternately used and regenerated, for example, 15 to 20 times, and which has become too inefficient for economical use in the decolorization of petroleum oils is also adapted for use in accordance with my invention. Such fuller's earth, although containing considerable quantities of fixed carbon, is very effective in increasing the pH of sugar solutions.

My invention may be further illustrated by the following examples, which however are not intended as limiting the scope thereof.

A decolorized 60° Brix wash liquor obtained by filtering washed sugar liquor through bone char and having a pH of 6.3 was divided into 3 batches. The first batch was percolated through a bed of fuller's earth which had been calcined for ½ hour at 900° F., the second batch through fuller's earth which had been calcined for ½ hour at 1100° F., and the third batch through fuller's earth which had been calcined for ½ hour at 1300° F. The pH of the filtrates was taken at various composite yields, expressed in pounds of sugar solids per pound of earth, and the composite filtrates were analyzed for purity (per cent sucrose), ash, invert, and color. The percolations through the fuller's earth were made at 165° F., at a rate of 2.27 pounds of sugar solids per pound of earth per hour.

| Yield, pounds sugar solids per pound of earth | pH of filtrate | | |
| --- | --- | --- | --- |
|  | 900° F. | 1,100° F. | 1,300° F. |
| 2 | 7.4 | 7.7 | 7.9 |
| 20 | 7.6 | 8.2 | 8.4 |
| 40 | 7.6 | 8.1 | 8.4 |
| 60 | 7.6 | 8.0 | 8.3 |
| 80 | 7.6 | 7.9 | 8.1 |
| 100 | 7.4 | 7.6 | 7.9 |
| 123 | 7.3 | 7.4 | 7.9 |

The analyses of the washed sugar liquor charged to the filters and the composite filtrates are given in the following table. The composite filtrates represent 123 pounds of sugar solids per pound of earth.

| Analysis | Charge | Filtrates | | |
|---|---|---|---|---|
| | | 900° F. | 1,100° F. | 1,300° F. |
| Purity (weight per cent sucrose) | 98.008 | 98.465 | 98.261 | 98.576 |
| Invert sugar (weight per cent) | 0.795 | 0.715 | 0.713 | 0.715 |
| Ash (weight per cent) | 0.151 | 0.161 | 0.080 | 0.118 |
| Undetermined (weight per cent) | 1.046 | 0.659 | 0.946 | 0.591 |
| Color (60° Brix) | 2.5 | 2.4 | 2.4 | 2.5 |
| pH | 6.3 | 7.3 | 7.4 | 7.9 |

From the above examples, it will be seen that in accordance with my invention, I am able to increase the pH of a bone char filtrate from 6.3 to higher than 7.0 by filtration through calcined fuller's earth. At a yield of 123 pounds of sugar solids per pound of earth, the pH of the filtrates ranged between 7.3 and 7.9, and had the filtration been continued until the filtrate pH had fallen to 7.0, the filtrate yield would have been considerably greater, and if the operation had been continued until pH of the composite filtrate reached 7.0, the yield would have been even larger.

A 65° Brix washed sugar liquor was filtered through 10–30 mesh bauxite which had been activated by calcining at 1200° F. for ½ hour and cooled prior to use. The filtrate from the bauxite was then divided into 3 batches. The first batch was percolated through a bed of 10–30 mesh fuller's earth which had been calcined for ½ hour at 900° F., the second batch through 10–30 mesh fuller's earth which had been calcined for ½ hour at 1100° F., and the third batch through 10–30 mesh fuller's earth which had been calcined for ½ hour at 1300° F. Analyses of the washed sugar liquor (charge), the bauxite filtrate, and the fuller's earth filtrates are given in the following table. The bauxite filter was run to a yield of 2 pounds of sugar solids per pound of bauxite, while the fuller's earth filters were run to yields of 12 pounds of sugar solids per pound of earth. A determination of the pH was also made at a yield of 100 pounds of sugar solids per pound of earth.

| Analysis | Charge | Bauxite filtrate | Fuller's earth filtrates | | |
|---|---|---|---|---|---|
| | | | 900° F. | 1,100° F. | 1,300° F. |
| Purity (weight per cent sucrose) | 98.064 | 98.331 | 98.341 | 98.668 | 98.445 |
| Invert sugar (weight per cent) | 0.370 | 0.320 | 0.320 | 0.294 | 0.296 |
| Ash (weight per cent) | 0.067 | 0.032 | 0.027 | 0.038 | 0.052 |
| Undetermined (weight per cent) | 1.499 | 1.317 | 1.312 | 1.000 | 1.207 |
| Color (65° Brix) | 28.9 | 2.2 | 2.2 | 2.3 | 2.3 |
| pH | 6.4 | 6.0 | 7.4 | 8.3 | 8.6 |
| pH at 100 pounds sugar solids per pound of earth | | | 7.0 | 6.9 | 7.1 |

While I have described my invention herein particularly with reference to the use of natural fuller's earth of the Georgia-Florida type which has been ground and screened to the desired mesh size, and thereafter calcined by heating at elevated temperatures, I may also employ fuller's earth which has been subjected to pretreatment, for example, with water, or water containing added $CO_2$, or dilute aqueous solutions of other acids such as HCl, $H_2SO_4$ and the like. The fuller's earth may be washed with water, preferably at elevated temperatures of the order of 150° F.–210° F., or the earth may be treated with water containing added $CO_2$ or other acid, and then washed with water and dried prior to use. Such pretreatment is necessary only in the case of fuller's earth which tends to increase the ash content of sugar solutions to an undesirable degree.

I have also found that fuller's earth, and particularly fuller's earth of the Georgia-Florida type, when subjected to an intensive kneading, mixing, and shearing action under high pressure to disrupt the natural structure of the earth, possesses a higher capacity for increasing the pH of sugar solutions than earth which has not been so treated. Fuller's earth, as mined, is rendered plastic by the addition of sufficient water to bring the water content (volatile matter) within the range of from 45 per cent to 60 per cent by weight. The plastic earth is then disrupted by passage through an extrusion press at pressure between 100 and 1000 pounds per square inch, and the extruded earth is thereafter dried, ground and screened to suitable mesh size, and calcined at a temperature in excess of 700° F. The extrusion press employed may be of the single or double auger type, provided with a die plate containing a plurality of holes of suitable size, for example, $\frac{1}{16}$ to ⅞ inch diameter.

The following is exemplary of the results which may be obtained by utilizing extruded fuller's earth for increasing the pH of sugar solutions, as compared with unextruded fuller's earth.

A Georgia-Florida fuller's earth was taken from the mine and admixed with sufficient water to give a total volatile content of 54 per cent by weight. This plastic earth was then extruded in a double auger type extrusion press provided with a die plate containing a plurality of ¼ inch diameter holes, the die plate pressure being about 900 pounds per square inch. The extruded earth was dried, ground and screened to 30–60 mesh, and calcined at 1100° F. A washed sugar liquor was then filtered through a bed of the extruded earth to a pH of 7.0, and there was obtained a yield of 241 pounds of sugar solids per pound of earth. Another portion of the same washed sugar liquor was filtered through unextruded, calcined fuller's earth to a pH of 7.0 and there was obtained a yield of 203 pounds of sugar solids per pound of earth. From these results it is evident that the extruded earth possessed a substantially higher capacity for increasing the pH of sugar solutions than the unextruded earth.

The ability to increase the pH of sugar solutions appears to be confined to fuller's earth, since I have found that other argillaceous materials such as bentonite, kaolin, and illite, and the mineral greensand produce a marked reduction in the pH of sugar solutions which have been treated therewith. My invention is applicable to any type of saccharin liquid requiring adjustment of pH, and is particularly adapted in the treatment of cane sugar liquors or syrups which have been decolorized or refined by previous filtration through bone char, bauxite, or other decolorizing agents, and particularly bauxite which has been activated by heating at temperatures between 600° F. and 1600° F. Other saccharin liquids which may be satisfactorily treated in accordance with my invention include solutions of beet sugar, glucose, dextrine, as well as molasses, sweet potato syrup, corn syrup, and the like.

What I claim is:

1. The method of treating a substantially decolorized saccharin liquid to increase the pH thereof, which comprises contacting said liquid with fuller's earth which has been heated to a temperature of from 700° F. to 1600° F. and cooled, and separating the treated liquid from said earth.

2. The method of treating a sugar solution, which comprises filtering said solution first through a decolorizing adsorbent to substantially decolorize said solution, and then filtering said decolorized solution through fuller's earth which has been heated to a temperature of from 700° F. to 1600° F. and cooled, to increase the pH of said solution.

3. The method of treating a sugar solution, which comprises filtering said solution first through bone char to substantially decolorize said solution, and then filtering said decolorized solution through fuller's earth which has been heated to a temperature of from 700° F. to 1600° F. and cooled, to increase the pH of said solution.

4. The method of treating a sugar solution, which comprises filtering said solution first through bauxite which has been heated to a temperature of from 600° F. to 1600° F. to substantially decolorize said solution, and then through fuller's earth which has been heated to a temperature of from 700° F. to 1600° F. and cooled, to increase the pH of said solution.

5. The method of increasing the pH of a sugar solution, which comprises filtering said solution through fuller's earth which has been heated to a temperature of from 700° F. to 1600° F. and cooled, the quantity of sugar solids treated being at least 10 pounds per pound of fuller's earth.

6. The method of increasing the pH of a sugar solution, which comprises filtering said solution through fuller's earth which has been heated to a temperature of from 700° F. to 1600° F. and cooled, washed with water, and dried prior to the filtration of the sugar solution therethrough.

7. The method of increasing the pH of a sugar solution, which comprises filtering said solution through fuller's earth which has been heated to a temperature of from 700° F. to 1600° F. and cooled, washed with water at a temperature of from 150° F. to 210° F., and dried prior to the filtration of the sugar solution therethrough.

8. The method of increasing the pH of a sugar solution, which comprises filtering said solution through fuller's earth which has been heated to a temperature of from 700° F. to 1600° F. and cooled, washed with a dilute acid and then with water, and dried prior to the filtration of the sugar solution therethrough.

9. The method of increasing the pH of a sugar solution, which comprises filtering said solution through fuller's earth which has been heated to a temperature of from 700° F. to 1600° F. and cooled, washed at a temperature of from 150° F. to 180° F. with a dilute acid and then with water, and dried prior to the filtration of the sugar solution therethrough.

10. The method of increasing the pH of a sugar solution, which comprises filtering said solution through fuller's earth which has been heated to a temperature of from 700° F. to 1600° F. and cooled, until the ability of the fuller's earth to increase the pH of the sugar solution has been substantially exhausted, removing residual sugar solution from said earth, regenerating said exhausted earth by heating to a temperature at least as high as that to which the earth had been initially heated and filtering additional quantities of sugar solution through said regenerated earth.

11. The method of increasing the pH of a sugar solution, which comprises filtering said solution through previously spent fuller's earth which has been regenerated at temperatures between 700° F. and 1600° F.

12. The method of increasing the pH of a sugar solution, which comprises filtering said solution through fuller's earth which has been subjected to extrusion at a pressure in excess of 100 pounds per square inch and calcination at a temperature of from 700° F. to 1600° F.

13. The method of treating a saccharin liquid having a pH below 7 to increase the pH thereof, which consists in contacting said liquid with fuller's earth which has been calcined at a temperature of from 700° F. to 1600° F.

14. The method of treating a decolorized saccharin liquid having a pH below 7 to increase the pH thereof, which consists in contacting said liquid with fuller's earth which has been calcined at a temperature of from 700° F. to 1600° F.

15. The method of increasing the pH of a sugar solution, which comprises contacting the solution with previously spent fuller's earth which has been regenerated at a temperature between 700° F. and 1600° F.

WILLIAM A. LA LANDE, Jr.